United States Patent [19]
Shiomi et al.

[11] Patent Number: 5,541,743
[45] Date of Patent: Jul. 30, 1996

[54] METHOD OF AND APPARATUS FOR GENERATING HALFTONE IMAGE WITH COMPENSATION FOR DIFFERENT DOT GAIN CHARACTERISTICS

[75] Inventors: Junichi Shiomi; Takashi Sakamoto, both of Kyoto, Japan

[73] Assignee: Dainippon Screen Mfg. Co., Ltd., Kyoto, Japan

[21] Appl. No.: 488,557

[22] Filed: May 26, 1995

[30] Foreign Application Priority Data

Jun. 7, 1994 [JP] Japan .................... 6-150479

[51] Int. Cl.⁶ .................... H04N 1/405; H04N 1/52
[52] U.S. Cl. .................... 358/534; 358/536; 358/456; 358/298
[58] Field of Search .................... 358/459, 458, 358/456, 406, 534, 536, 298

[56] References Cited

U.S. PATENT DOCUMENTS 4,727,430  2/1988  Miwa .................... 358/459
5,255,085  10/1993  Spence .................... 358/406

FOREIGN PATENT DOCUMENTS 4-28191  5/1992  Japan .

Primary Examiner—Scott A. Rogers
Attorney, Agent, or Firm—Lowe, Price, LeBlanc & Becker

[57] ABSTRACT

An exposure signal representing a halftone image is generated by executing tone correction on at least either of an image signal and n pieces of dot pattern signals, and by comparing the image signal with the n pieces of dot pattern signals after the tone correction. The tone correction characteristics are set to compensate for a difference in dot gain characteristics between dot types. The halftone image is accordingly reproduced with the compensated dot gain characteristics.

17 Claims, 7 Drawing Sheets

METHOD OF AND APPARATUS FOR GENERATING HALFTONE IMAGE WITH COMPENSATION FOR DIFFERENT DOT GAIN CHARACTERISTICS

BACKGROUND OF THE INVENTION

1. Field of the Invention

The present invention pertains to a method and an apparatus for generating a halftone image based on an image signal representing an original contone image.

2. Description of the Related Art

In color offset printing, an original contone image, such as a photograph image, is divided into four color separation images corresponding to four color inks, that is, yellow, magenta, cyan, and black. A print is reproduced by overprinting the four color separation images with respective color inks one upon another.

Usually, the four color separation images are recorded on respective photosensitive films, and four printing plates are produced from those films. An image on a photosensitive film or on a printing plate will be hereinafter referred to as "halftone image". A halftone image is composed of small dots, or halftone dots, on which the color ink is to be applied. The halftone dots are arranged at lattice points of regular intervals, and the density of the halftone image is defined by an area rate of the halftone dots. The area rate of the halftone dots is generally called a dot percent, or a halftone dot area rate.

The interval between halftone dots is defined by a screen ruling, and an orientation of the array of the halftone dots is defined by a screen angle. The screen ruling indicates the number of halftone dots per inch. The greater screen ruling reproduces an image of higher resolution. A conventional method utilizes halftone dots having a relatively low resolving power, whose screen ruling is up to about 175 lines per inch.

Recent advancement in printing technology allows applications of halftone dots having a high resolving power whose screen ruling is as much as 300 or more lines per inch. Those halftone dots will be hereinafter referred to as high definition dots. The greater screen ruling makes each dot smaller and allows an original image to be reproduced with high resolution.

The above halftone dots are arranged in a fixed array and the size of the dots is changed according to the density of the original image. In other words, an image is reproduced with halftone dots by expressing the density of the image by means of Amplitude Modulation. The density of an image can be also expressed by means of Frequency Modulation, which is called FM screening or FM dots. In the FM screening, dots on which ink is applied have a fixed size while the frequency of appearance of dots is varied with the density of the image. The FM screening uses dots which are significantly smaller than conventional halftone dots, thus reproducing an original image with high resolution.

Since the FM dots have a non-periodical arrangement unlike the conventional halftone dots, it is not correct to call the FM dots "halftone dots". In this specification, both the halftone dots and the FM dots will be called "printing dots" or simply "dots". "High resolution dots" include the FM dots and the high definition halftone dots.

The high resolution dots reproduce details of an original image more clearly and precisely than low resolution halftone dots. The high definition halftone dots having the small printing-dot size makes rosette moires sufficiently inconspicuous. The FM screening also prevents rosette moires because the arrangement of the FM dots is not periodical.

Since the high resolution dots have a small dot size, they have significantly different dot gain characteristics from those of the low resolution dots. The dot gain characteristics denotes variation in dot percent in making a printing plate from a halftone film or in actual printing procedure. The dot gain characteristics depend on a dot shape and a screen ruling. The high definition halftone dots and the FM dots have different dot gain characteristics. Application of the high resolution dots to highlight areas in an image causes a dot loss and reduces the dot percent compared with the low resolution halftone dots, whereas application of the high resolution dots to middle-tone areas and shadow areas results in a dot gain and makes the dot percent greater than that of the low resolution halftone dots.

A prepress process and a printing process are executed generally based on the dot gain characteristics of the conventional low resolution halftone dots. The low resolution halftone dots are preferable to the high resolution dots in terms of reproducibility of dot size. It may be accordingly preferred to apply high resolution dots to some areas in an original image and low resolution dots to the other areas.

If a halftone image is prepared by selectively applying high resolution dots and low resolution dots to a plurality of image areas in one image, the difference in the dot gain characteristics may cause the plurality of image area to have different printing characteristics, that is, relation between the density of a reproduced image and a level of an original image signal. Such a problem arises when a plural types of dots having different dot gain characteristics are applied to one image.

Even when each whole image is reproduced with one type of dots, two images reproduced with the same machine may have different printing characteristics if different types of dots are applied to them.

SUMMARY OF THE INVENTION

An object of the present invention is accordingly to compensate dot gain characteristics of different dots types.

The present invention is directed to a method of generating a halftone image from an image signal representing an original image. The method comprises the steps of: (a) dividing the original image into a plurality of image areas and assigning one of a plurality of dot types to each of the plurality of image areas, the plurality of dot types having a difference in dot gain characteristics between each other; (b) providing an image signal and a plurality of dot pattern signals, the plurality of dot pattern signals representing threshold values adaptable to generate respective dots of the plurality of dot types; (c) executing tone correction on at least either of the image signal and the plurality of dot pattern signals to compensate for the difference in dot gain characteristics between the plurality of dot types; and (d) comparing the image signal with one of the plurality of dot pattern signals after the tone correction in each of the plurality of image areas, to thereby generate an image recording signal representing a halftone image in which each of the plurality of image areas is reproduced with one of the plurality of dot types assigned to the each of the plurality of image areas.

Accordingly, the original image is reproduced with compensated dot gain characteristics of each dot type even when different types of dots are applied to one image.

In a preferred embodiment of the present invention, the step (c) comprises the step of: correcting the image signal to compensate for the difference in the dot gain characteristics.

Alternatively, the step (c) comprises the step of: correcting the plurality of dot pattern signals to compensate for the difference in the dot gain characteristics.

The plurality of dot types comprises a high resolution dot having a relatively high resolving power, and a low resolution dot having a relatively low resolving power.

The high resolution dot includes a Frequency Modulation dot whose frequency of appearance is varied with image density.

The present invention is also directed to an apparatus for generating a halftone image from an image signal representing an original image. The apparatus comprising: area discriminating means for providing an area discrimination signal discriminating a plurality of image areas in the original image, each of the plurality of image areas being assigned to one of a plurality of dot types, the plurality of dot types having a difference in dot gain characteristics between each other; means for providing an image signal and a plurality of dot pattern signals, the plurality of dot pattern signals representing threshold values adaptable to generate respective dots of the plurality of dot types; conversion means for executing tone correction on at least either of the image signal and the plurality of dot pattern signals to compensate for the difference in dot gain characteristics between the plurality of dot types; and recording signal generation means for comparing the image signal with one of the plurality of dot pattern signals after the tone correction in each of the plurality of image areas while discriminating the plurality of image areas according to the area discrimination signal, to thereby generate an image recording signal representing a halftone image in which each of the plurality of image areas is reproduced with one of the plurality of dot types assigned to the each of the plurality of image areas.

In one preferred embodiment, the apparatus further comprises: means for storing a plurality of conversion characteristics corresponding to respective dot gain characteristics of the plurality of dot types; and wherein the conversion means comprises: means for correcting the plurality of dot pattern signals as a function of the plurality of conversion characteristics, respectively, to thereby generate a plurality of corrected dot pattern signals; and the recording signal generation means comprises: means for comparing the image signal with one of the plurality of corrected dot pattern signals in each of the plurality of image areas.

These and other objects, features, aspects, and advantages of the present invention will become more apparent from the following detailed description of the preferred embodiments with the accompanying drawings.

DESCRIPTION OF THE PREFERRED EMBODIMENT

A. First Embodiment

Figure 1:
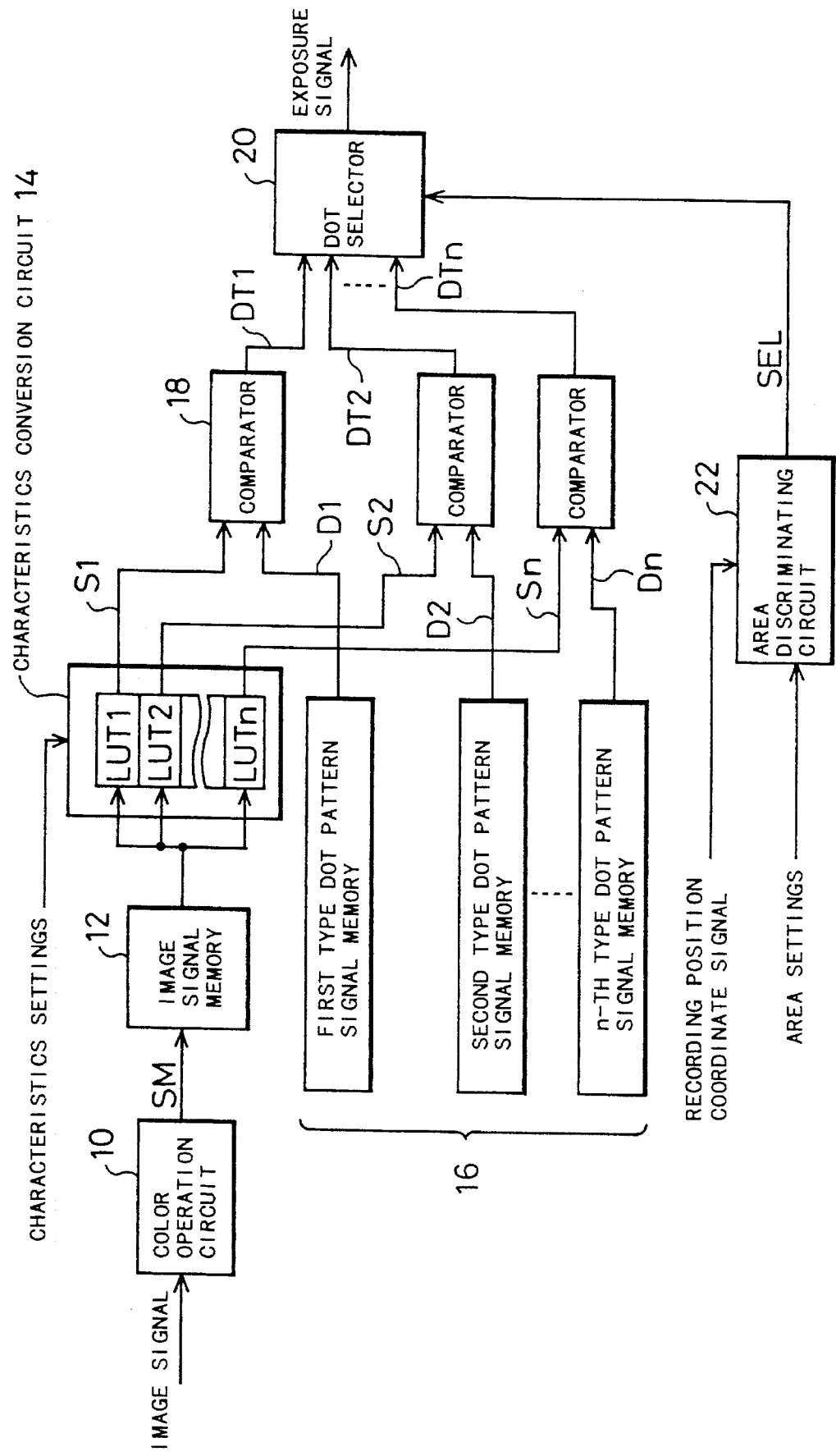
FIG. 1 is a block diagram illustrating the structure of a halftone image producing apparatus as a first embodiment according to the invention.

FIG. 1 is a block diagram illustrating a main part of a dot generating apparatus as a first embodiment according to the invention. The dot generating apparatus comprises: a color operation circuit 10 for executing color operations on image signals; an image signal memory 12 for storing image signals; a characteristics conversion circuit 14 for converting tone characteristics of image signals; n pieces of dot pattern signal memories 16 for storing n pieces of dot pattern signals; n pieces of comparators 18 for comparing image signals with the n pieces of dot pattern signals; a dot selector circuit 20 for selecting one of outputs DT1 through DTn from the n pieces of comparators 18; and an area discriminating circuit 22 for transmitting an area discrimination signal SEL to the dot selector circuit 2. The area discrimination signal SEL identifies each area included in an image. The n pieces of dot pattern signals stored in the memories 16 represent n types of different dots, respectively.

The color operation circuit 10 executes a variety of processing and operations, including color correction, tone correction, generation of a black separation, removal of under color, and enhancement of sharpness, on image signals read by an image capturing device such as a color scanner. An image signal SM output from the color operation circuit 10 includes four color separation signals of a yellow component (Y), a magenta component (M), a cyan component (C), and a black component (K). The image signal SM is stored in the image signal memory 12.

Figure 2:
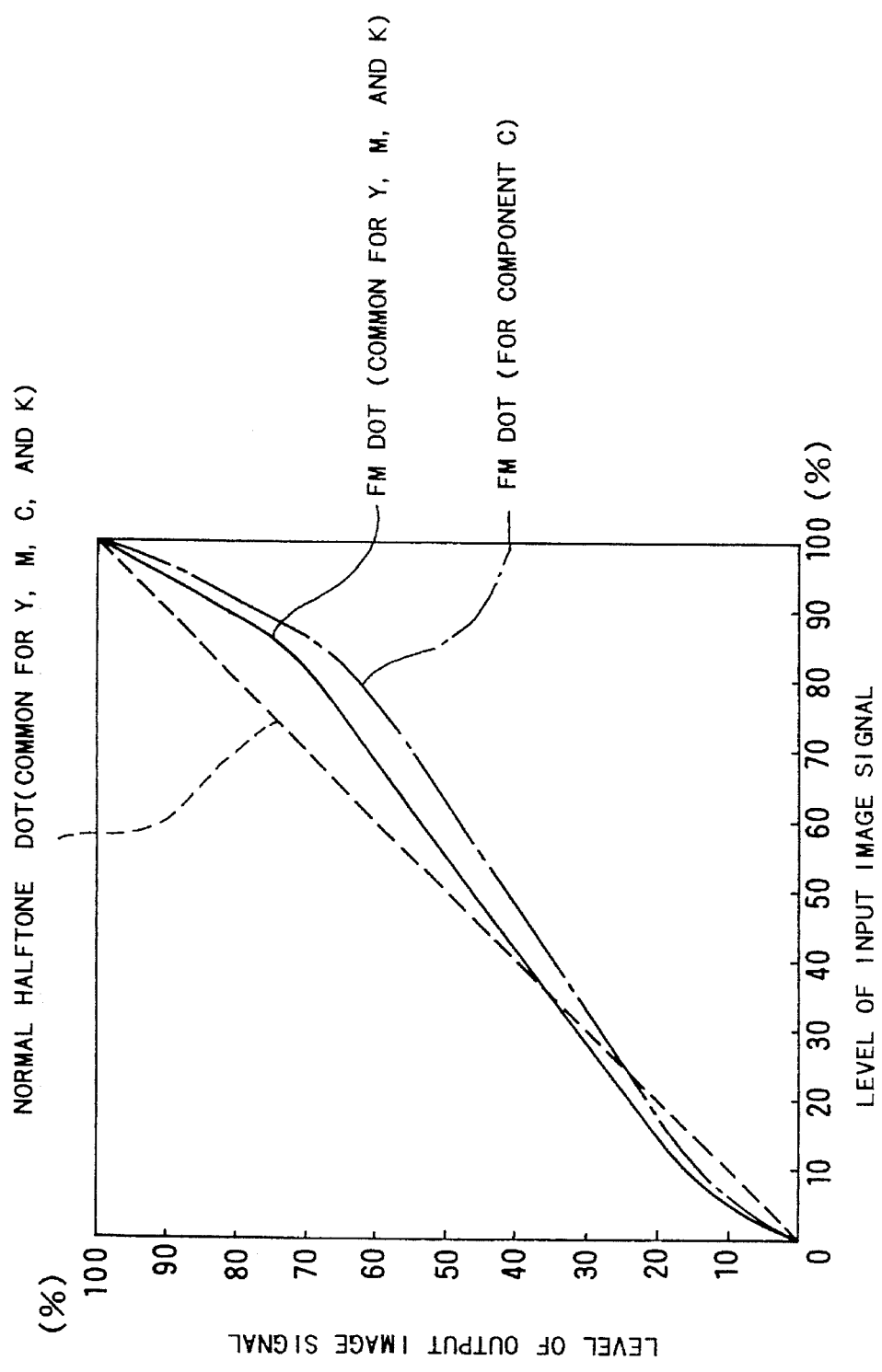
FIG. 2 is a graph illustrating tone correction characteristics stored in look-up tables of a characteristics conversion circuit 14.

The characteristics conversion circuit 14 is provided with n pieces of look-up tables, which respectively store tone correction characteristics, or tone conversion characteristics, corresponding to the n types of different dots. FIG. 2 is a graph illustrating tone correction characteristics stored in the look-up tables of the characteristics conversion circuit 14. The example of FIG. 2 shows tone correction characteristics of a conventional, low resolution square halftone dot, or a normal halftone dot, and those of an FM dot, or a high resolution dot. In the embodiment, the normal halftone dot has linear tone correction characteristics, which do not convert the input image signals.

According to the tone correction characteristics of the FM dot, the dot percent is increased in highlight areas where the input image signals are at relatively low levels, and it is decreased in middle-tone areas and shadow areas where the input image signals are at relatively high levels. This compensates for a difference between dot gain characteristics of the normal halftone dot and those of the FM dot. The tone correction characteristics for the component C of the FM dot are different from those for the components Y, M, and K. If some color component has different tone correction characteristics from other color components, as the case with the FM dot shown in FIG. 2, the tone correction characteristics of the respective colors are stored in the look-up tables.

The tone correction characteristics as shown in FIG. 2 are determined by taking into account a variety of characteristics such as an END (Equivalent Neutral Density) balance, print reproduction characteristics, and halftone positive characteristics. These characteristics are affected by printing conditions, which include a printing paper, inks, and conditions of a printing machine. If the look-up tables in the characteristics conversion circuit 14 are implemented by RAMs, appropriate tone correction characteristics according to the printing conditions can be set into the look-up tables at a printing shop.

The tone correction characteristics of the FM dot may have linear plots while those for the normal halftone dot have non-linear plots in order to achieve the same compensation as FIG. 2. Alternatively, the tone correction characteristics may be set non-linear for both the FM dot and the normal halftone dot.

In the circuit of FIG. 1, one of the four color separation signals Y, M, C, and K is read out of the image signal memory 12 and commonly given to the n pieces of look-up tables in the characteristics conversion circuit 14. The n pieces of image signals S1 through Sn are output from the n pieces of look-up tables, respectively.

The n pieces of dot pattern signal memories 16 store different dot pattern signals, which are used as threshold values for recording the respective dots. The n pieces of comparators 18 respectively compare dot pattern signals D1 through Dn read out of the n pieces of dot pattern signal memories 16 with the corresponding image signals S1 through Sn.

Figure 3:
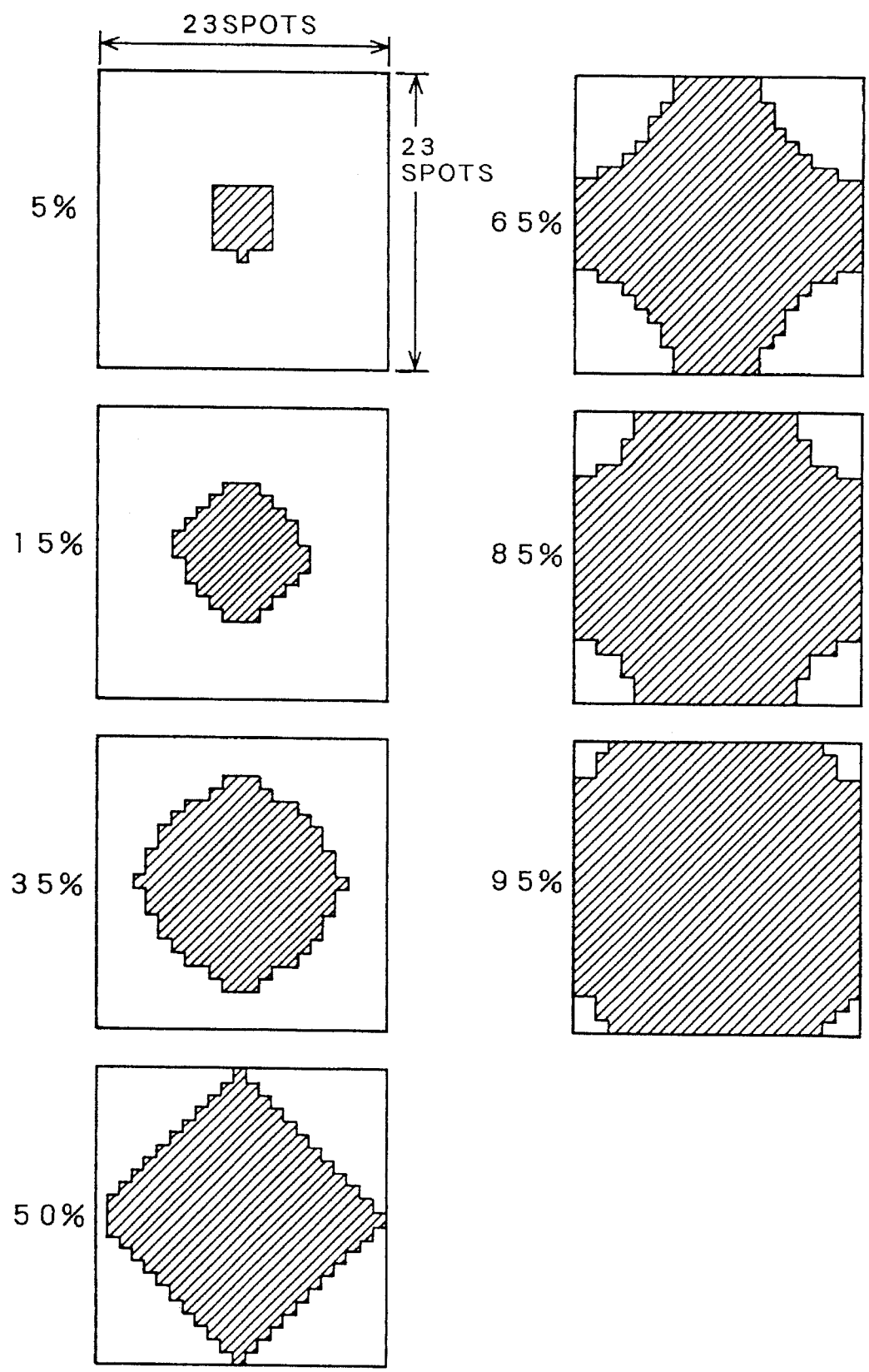
FIG. 3 shows a variation in dot shape of a square halftone dot or a low resolution dot in a unit area.
Figure 4:
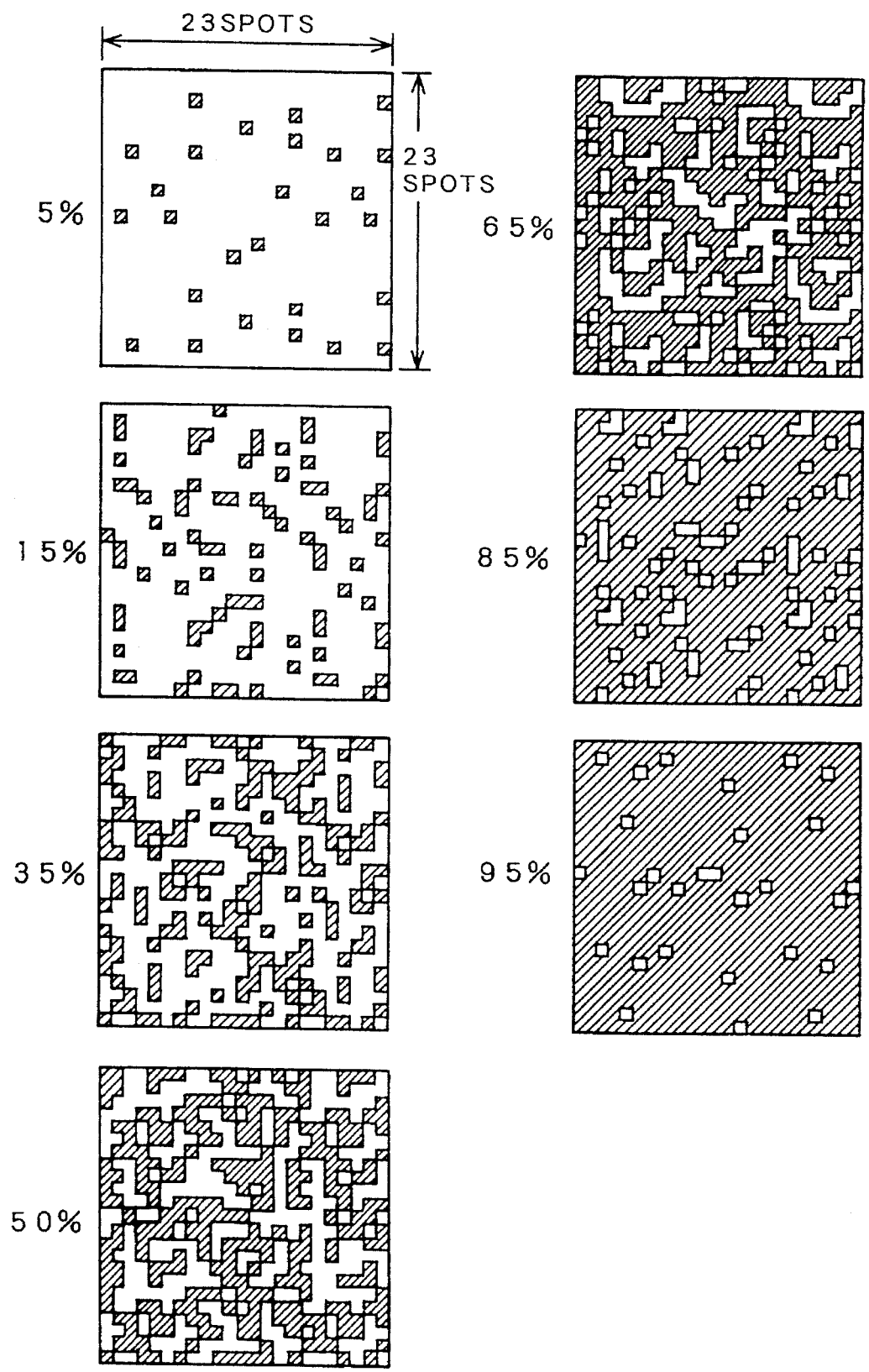
FIG. 4 illustrates a variation in dot arrangement of FM dots or high resolution dots in the same unit area.

FIG. 3 shows a variation in dot shape of the normal square dot in a unit area, whereas FIG. 4 illustrates a variation in dot arrangement of the FM dots in the same unit area. The unit area has a size of 23 spots by 23 spots in this embodiment. Each spot corresponds to one record pixel, which is a unit of recording in a recording scanner. As to the square dot shown in FIG. 3, the area of one black dot increases with the increase in density. As to the FM dots shown in FIG. 4, on the other hand, the frequency of appearance of black dots increases with the increase in density. Incidentally, one pixel of the input image signal has, for example, the size of 10 spots by 10 spots.

A threshold pattern representing a variation in dot percent of the square dot as shown in FIG. 3 is stored in a first type dot pattern signal memory (FIG. 1) while another threshold pattern representing a variation in the arrangement of the FM dots as shown in FIG. 4 is stored in a second type dot pattern signal memory. The unit threshold patterns for the square dot and the FM dot are virtually repeated to be applied on an image plane of a recording image without any clearances. In order to realize the repeated arrangement of each threshold pattern, each threshold pattern is repeatedly read out at a predetermined period. Actually, the threshold pattern stored in each memory has dimensions of more than 23 spots by 23 spots.

The FM dots are arranged at random as shown in FIG. 4, thus preventing both rosette moires and object moires. The object moires occur due to interference of a pattern in an original image with a periodic arrangement of dots. The small FM dots also realize favorable reproducibility in details of the image. In reproduction of a color print by overprinting a plurality of color separation images one upon another, different threshold patterns are applied to halftone images of the respective color inks. This effectively prevents color mismatch, or color shift in a resulting print from a desired color, due to misalignment of plates in printing process.

There are several types of FM dot: the frequency of appearance is varied according to the density of an image for one type; and the frequency of appearance and the dot size are varied according to the density for another type. The term "FM dot" in this specification means a type for which at least the frequency of appearance is varied with the density of an image. The resolving power of FM dot as a high resolution dot is greater than about 600 dpi [dot per inch], and more preferably greater than about 800 dpi. Some recording scanners have a high resolving power of about 4,000 dpi. Upon condition that the FM dots are recorded by such a high resolution recording scanner, each FM dot may be set to occupy an area of 2×2 spots or 3×3 spots of the recording scanner. This prevents the size of each FM dot from being excessively small and improves the dot reproducibility in printing.

Applicable high resolution dots other than the FM dot include a high definition halftone dot, which has a greater screen ruling than a conventional, low resolution halftone dot. The high definition dot has a screen ruling of about 300 lpi [lines per inch] or more while a low resolution dot has that of about 200 lpi or less. Since the high definition halftone dot is small in size, it effectively prevents rosette moires and improves the reproducibility in image details.

Although the low resolution dot is inferior to the high resolution dot in reproducibility of image details, it has better printing stability and dot reproducibility than the high resolution dot in image areas of rather uniform density.

The n pieces of comparators shown in FIG. 1 respectively compare the n pieces of image signals S1 through Sn output from the characteristics conversion circuit 14 with the n pieces of dot pattern signals D1 through Dn read out of the n pieces of dot pattern signal memories 16, respectively. As a result, the comparators generate n pieces of exposure signals DT1 through DTn. The dot selector circuit 20 receives the n pieces of exposure signals DT1 through DTn thus generated and selects one of the n pieces of exposure signals DT1 through DTn to output the selected exposure signal.

The area discriminating circuit 22 outputs the area discrimination signal SEL for discriminating high-resolution dot areas from low-resolution dot areas in an image. The area discrimination signal SEL is given to the dot selector circuit 20 to select an exposure signal accordingly. The function of the area discriminating circuit 22 can be realized by a memory for storing bit map data whose values are different for the high-resolution dot areas and the low-resolution dot areas in the image. For example, the value of the bit map data is 1 for pixels in the high-resolution dot areas, and 0 for pixels in the low-resolution dot areas. When an image signal corresponding to each pixel is converted to an exposure signal by the comparators 18, the area discriminating circuit 22 reads out the bit map data from its internal memory according to a recording position coordinate signal representing the position of the recording pixel as an address to thereby output the same as the area discrimination signal SEL.

The high-resolution dot areas can be discriminated from the low-resolution dot areas arbitrarily according to user's interactive instructions, or alternatively according to some difference in characteristics of image areas. For example, a Laplacian filter is applied to the image signals representing an original image to obtain filtered image signals indicating spatial frequencies in the original image. Pixels having higher spatial frequencies than a threshold value are determined to be in a high-resolution dot area whereas the other pixels having lower spatial frequencies than the threshold value are determined to be in a low-resolution dot area. Accordingly, details of the image areas which have relatively high spatial frequencies are clearly reproduced by the high resolution dot. In the image areas which have relatively low spatial frequencies, on the other hand, the low resolution dot improves the stability and reproducibility of printing.

The exposure signal selected by the dot selector circuit 20 is given to a recording scanner (not shown), so that a halftone image is recorded on a photosensitive film. Alternatively, a printing plate can be produced directly from the exposure signal without recording a halftone image on the photosensitive film.

As described above, the first embodiment compensates for the dot gain characteristics of different dot types by converting the tone characteristics of image signals according to the dot type. This realizes well-balanced reproduction of both high-resolution dot areas and low-resolution dot areas included in one image. Even if only one of the high resolution dot and the low resolution dot is used to reproduce a whole image, the tone conversion efficiently makes the printing characteristics of the high resolution dot coincide with those of the low resolution dot.

B. Second Embodiment

Figure 5:
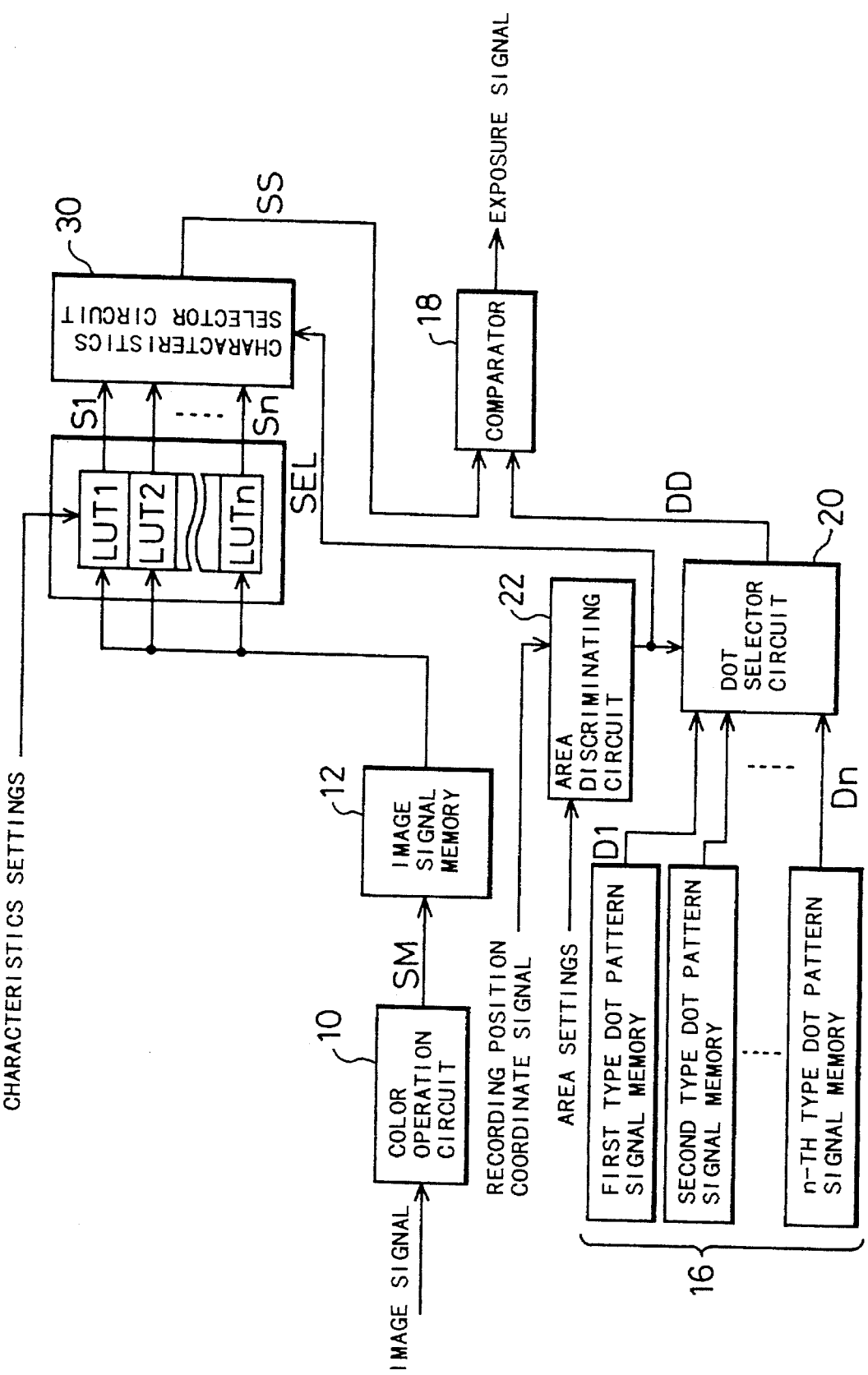
FIG. 5 is a block diagram showing a dot generating apparatus as a second embodiment according to the invention.

FIG. 5 is a block diagram showing another dot generating apparatus as a second embodiment according to the invention. The dot generating apparatus has a characteristics selector circuit 30 for selecting one of the n pieces of image signals S1 through Sn output from the characteristics conversion circuit 14. The dot selector circuit 20 selects one of the n pieces of dot pattern signals D1 through Dn. The characteristics selector circuit 30 and the dot selector circuit 20 executes the section according to the area discrimination signal SEL supplied from the area discriminating circuit 22. A comparator 18 compares an image signal SS selected by the characteristics selector circuit 30 with a dot pattern signal DD selected by the dot selector circuit 20 to thereby generate an exposure signal as a results of comparison.

The structure of the second embodiment attains the same effects as the first embodiment. The second embodiment shown in FIG. 5 requires only one comparator 18. The first embodiment shown in FIG. 1 includes the n pieces of comparators 18, but does not require the characteristics selector circuit 30 of FIG. 5.

C. Third Embodiment

Figure 6:
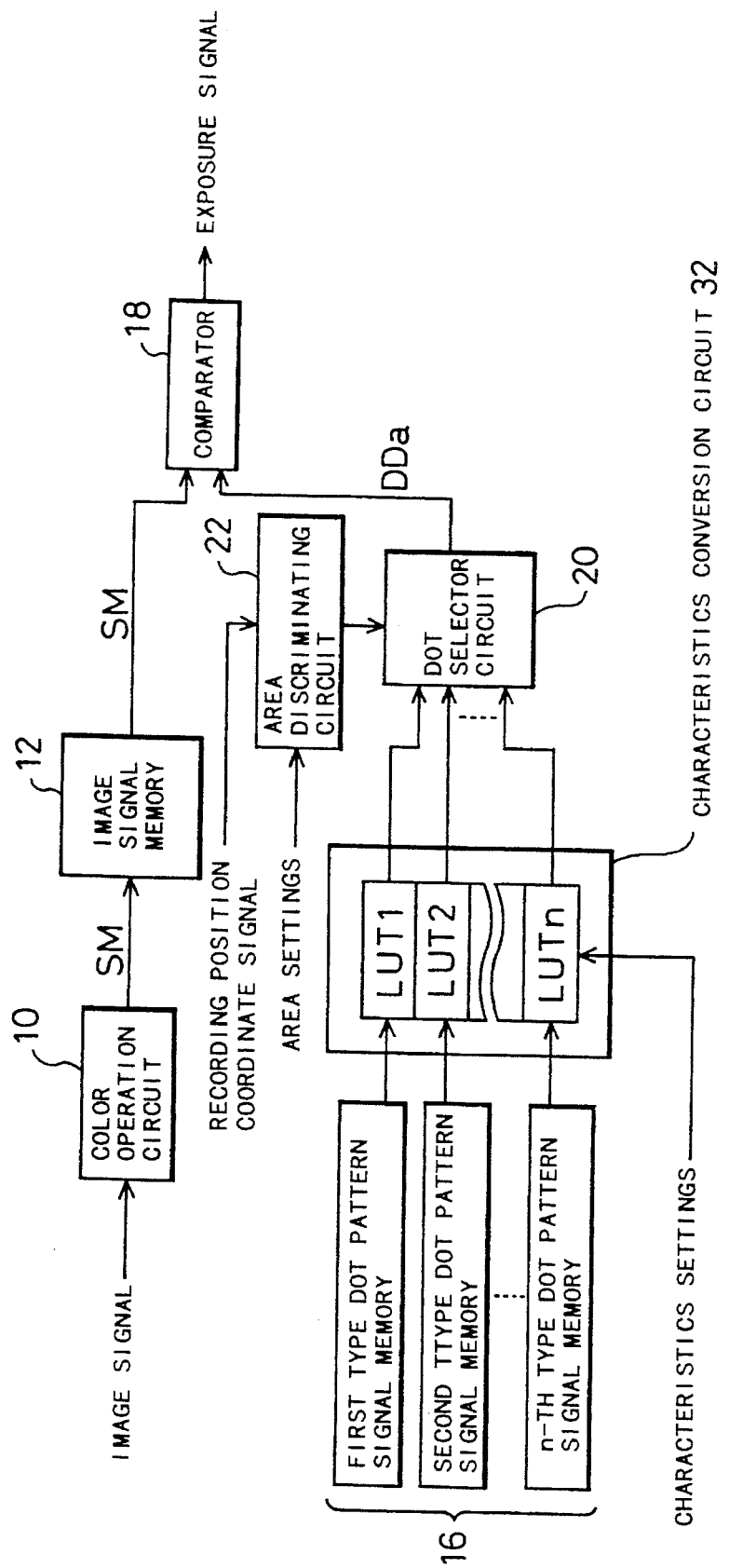
FIG. 6 is a block diagram showing another dot generating apparatus as a third embodiment according to the invention.

FIG. 6 is a block diagram illustrating still another dot generating apparatus as a third embodiment according to the invention. The dot generating apparatus does not have the characteristics conversion circuit 14 and the characteristics selector circuit 30 included in the second embodiment shown in FIG. 5, but instead has a characteristics conversion circuit 32 for dot pattern signals, which is arranged between the dot pattern signal memories 16 and the dot selector circuit 20.

The characteristics conversion circuit 32 is provided with n pieces of look-up tables for storing tone correction characteristics for the n pieces of dot pattern signals. The tone correction characteristics stored in the look-up tables are an invert of the tone correction characteristics shown in FIG. 2 across a straight line representing the linear characteristics, which coincides with the characteristics for the normal halftone dot in the example of FIG. 2. These conversion characteristics give the same outputs as the first and the second embodiments.

The image signal SM output from the image signal memory 12 is directly input into the comparator 18, which compares the image signal SM with a dot pattern signal DDa selected by the dot selector circuit 20. The structure of the third embodiment attains the same effects as the first and second embodiments. The third embodiment shown in FIG. 6 has only one comparator 18 and does not require the characteristics selector circuit 30 shown in FIG. 5.

D. Fourth Embodiment

Figure 7:
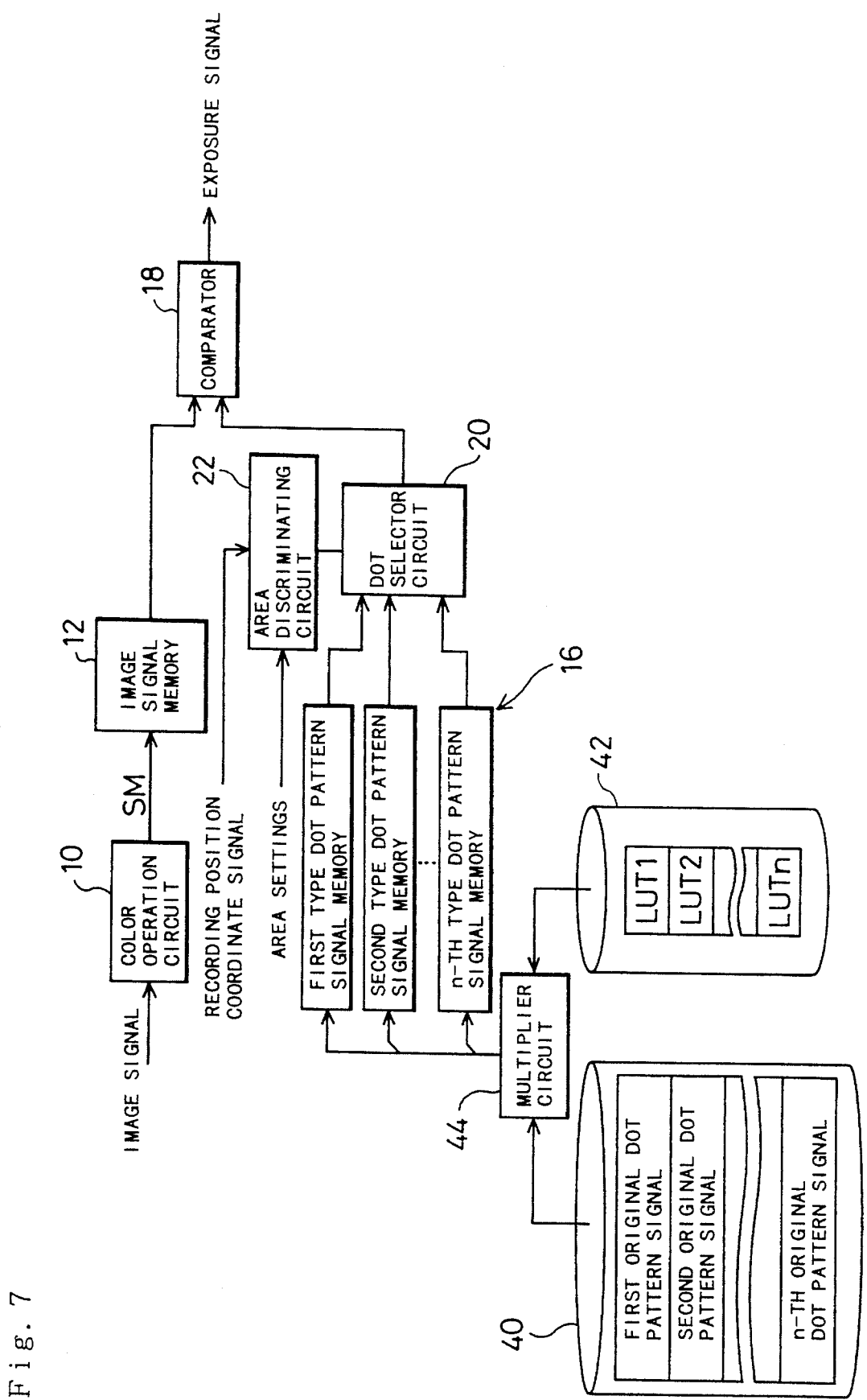
FIG. 7 is a block diagram showing still another dot generating apparatus as a fourth embodiment according to the invention.

FIG. 7 is a block diagram illustrating another dot generating apparatus as a fourth embodiment according to the invention. The dot generating apparatus is constructed by removing the characteristics conversion circuit 32 from the third embodiment shown in FIG. 6 and adding first and second external storage devices 40 and 42 and a multiplier circuit 44.

The first external storage device 40 stores n pieces of original dot pattern signals. The original dot pattern signals represent dot pattern signals before compensation of the dot gain characteristics. The dot pattern signals stored in the dot pattern signal memories 16 in FIGS. 1, 5, and 6 correspond to the original dot pattern signals in FIG. 7.

The second external storage device 42 stores contents of look-up tables, that is, tone correction characteristics, applied to the compensation for the n pieces of dot pattern signals. Alternatively, the original dot pattern signals and the tone correction characteristics may be stored in the same storage device. The multiplier circuit 44 multiplies the n pieces of original dot pattern signals read out of the first external storage device 40 by the n pieces of tone correction characteristics read out of the second external storage device 42, so as to generate n pieces of corrected dot pattern signals. The n pieces of corrected dot pattern signals are stored in the dot pattern signal memories 18, which are implemented by RAMs.

The fourth embodiment shown in FIG. 7 has the same effects as the first through third embodiments. A function of the multiplier circuit 44 can be carried out by a CPU (not shown) in the dot generating apparatus, which controls overall operations of the apparatus. This will reduce required hardware circuitry compared with the other embodiments.

The present invention is applicable to images which are not divided into high-resolution dot areas and low-resolution dot areas. For example, the apparatus of the embodiments can be applied to preparation of a halftone image which is reproduced with only the high-resolution dot. Since the tone characteristics are converted according to the printing conditions even in this case, a desirable reproduced image can be obtained according to the printing conditions.

As a modification of the above embodiments, n pieces of standard dot pattern signals, which reflect standard differences in dot gain characteristics, can be prepared in advance, and the standard dot pattern signals can be adjusted according to the actual tone characteristics by the characteristics conversion circuit in the cases of the embodiments of FIGS. 1, 5, and 6 or by the look-up tables in the case of the embodiment of FIG. 7. The actual tone characteristics depend on the printing conditions including a printing paper, inks, and service conditions of a printing machine.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating a halftone image from an image signal representing an original image, said method comprising the steps of:

(a) dividing said original image into a plurality of image areas and assigning one of a plurality of dot types to each of said plurality of image areas, said plurality of dot types having a difference in dot gain characteristics between each other;

(b) providing an image signal and a plurality of dot pattern signals, said plurality of dot pattern signals representing threshold values adaptable to generate respective dots of said plurality of dot types;

(c) executing tone correction on at least either of said image signal and said plurality of dot pattern signals to compensate for said difference in dot gain characteristics between said plurality of dot types; and (d) comparing said image signal with one of said plurality of dot pattern signals after the tone correction in each of said plurality of image areas, to thereby generate an image recording signal representing a halftone image in which each of said plurality of image areas is reproduced with one of said plurality of dot types assigned to said each of said plurality of image areas.

2. A method in accordance with claim 1, wherein said step (c) comprises the step of:

correcting said image signal to compensate for said difference in said dot gain characteristics.

3. A method in accordance with claim 2, wherein said plurality of dot types comprises a high resolution dot having a relatively high resolving power, and a low resolution dot having a relatively low resolving power.

4. A method in accordance with claim 3, wherein said high resolution dot includes a Frequency Modulation dot whose frequency of appearance is varied with image density.

5. A method in accordance with claim 1, wherein said step (c) comprises the step of:

correcting said plurality of dot pattern signals to compensate for said difference in said dot gain characteristics.

6. A method in accordance with claim 5, wherein said plurality of dot types comprises a high resolution dot having a relatively high resolving power, and a low resolution dot having a relatively low resolving power.

7. A method in accordance with claim 6, wherein said high resolution dot includes a Frequency Modulation dot whose frequency of appearance is varied with image density.

8. An apparatus for generating a halftone image from an image signal representing an original image, said apparatus comprising:

area discriminating means for providing an area discrimination signal discriminating a plurality of image areas in said original image, each of said plurality of image areas being assigned to one of a plurality of dot types, said plurality of dot types having a difference in dot gain characteristics between each other;

means for providing an image signal and a plurality of dot pattern signals, said plurality of dot pattern signals representing threshold values adaptable to generate respective dots of said plurality of dot types;

conversion means for executing tone correction on at least either of said image signal and said plurality of dot pattern signals to compensate for said difference in dot gain characteristics between said plurality of dot types; and recording signal generation means for comparing said image signal with one of said plurality of dot pattern signals after the tone correction in each of said plurality of image areas while discriminating said plurality of image areas according to said area discrimination signal, to thereby generate an image recording signal representing a halftone image in which each of said plurality of image areas is reproduced with one of said plurality of dot types assigned to said each of said plurality of image areas.

9. An apparatus in accordance with claim 8, wherein said conversion means comprises:

means for correcting said image signal to compensate for said difference in said dot gain characteristics.

10. An apparatus in accordance with claim 9, wherein said plurality of dot types comprises a high resolution dot having a relatively high resolving power, and a low resolution dot having a relatively low resolving power.

11. An apparatus in accordance with claim 10, wherein said high resolution dot includes a Frequency Modulation dot whose frequency of appearance is varied with image density.

12. An apparatus in accordance with claim 8, wherein said conversion means comprises:

means for correcting said plurality of dot pattern signals to compensate for said difference in said dot gain characteristics.

13. An apparatus in accordance with claim 12, wherein said plurality of dot types comprises a high resolution dot having a relatively high resolving power, and a low resolution dot having a relatively low resolving power.

14. An apparatus in accordance with claim 13, wherein said high resolution dot includes a Frequency Modulation dot whose frequency of appearance is varied with image density.

15. An apparatus in accordance with claim 8, further comprises:

means for storing a plurality of conversion characteristics corresponding to respective dot gain characteristics of said plurality of dot types; and wherein said conversion means comprises:

means for correcting said plurality of dot pattern signals as a function of said plurality of conversion characteristics, respectively, to thereby generate a plurality of corrected dot pattern signals; and said recording signal generation means comprises:

means for comparing said image signal with one of said plurality of corrected dot pattern signals in each of said plurality of image areas.

16. An apparatus in accordance with claim 15, wherein said plurality of dot types comprises a high resolution dot having a relatively high resolving power, and a low resolution dot having a relatively low resolving power.

17. An apparatus in accordance with claim 16, wherein said high resolution dot includes a Frequency Modulation dot whose frequency of appearance is varied with image density.

* * * * *